Patented Mar. 17, 1942

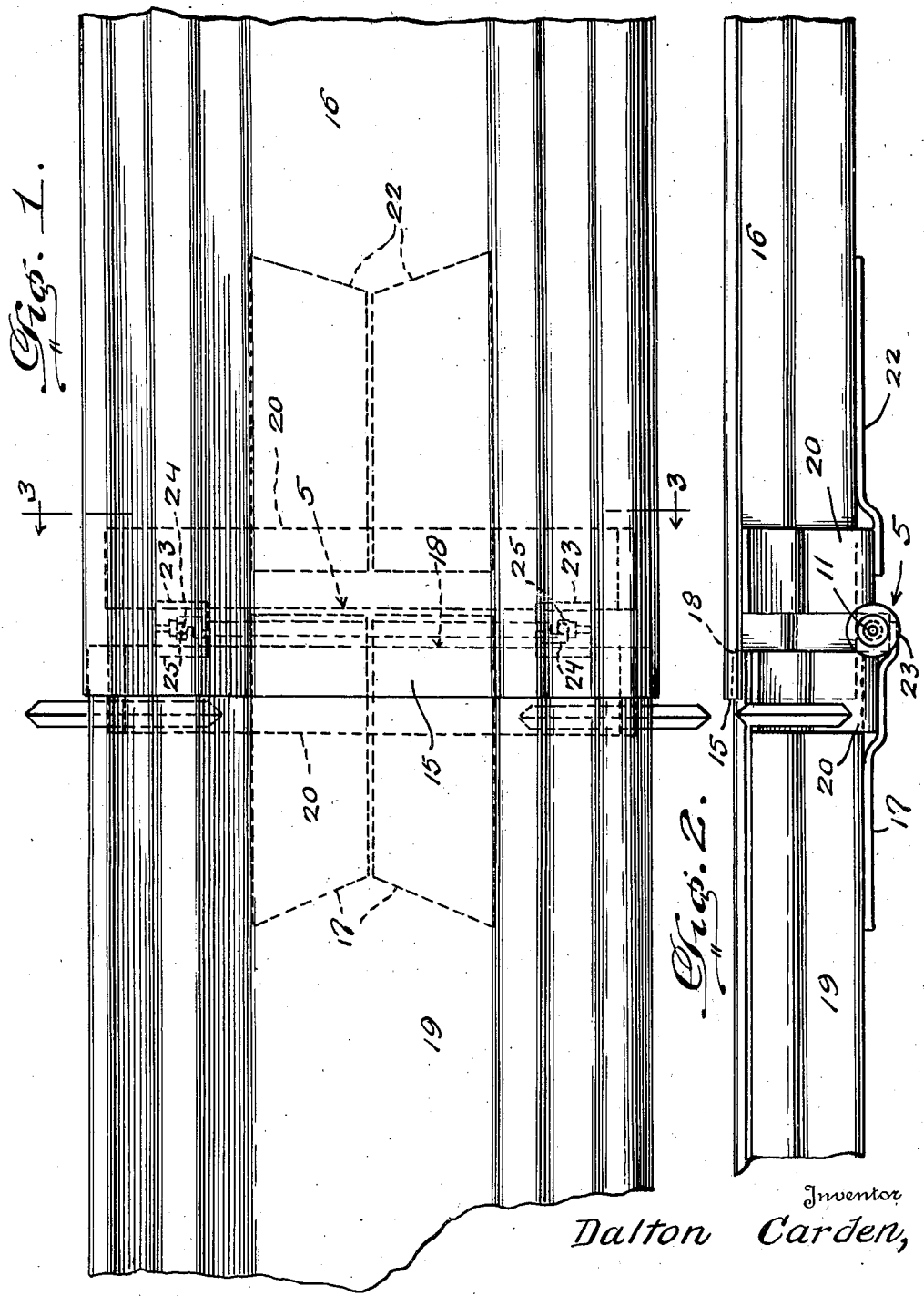

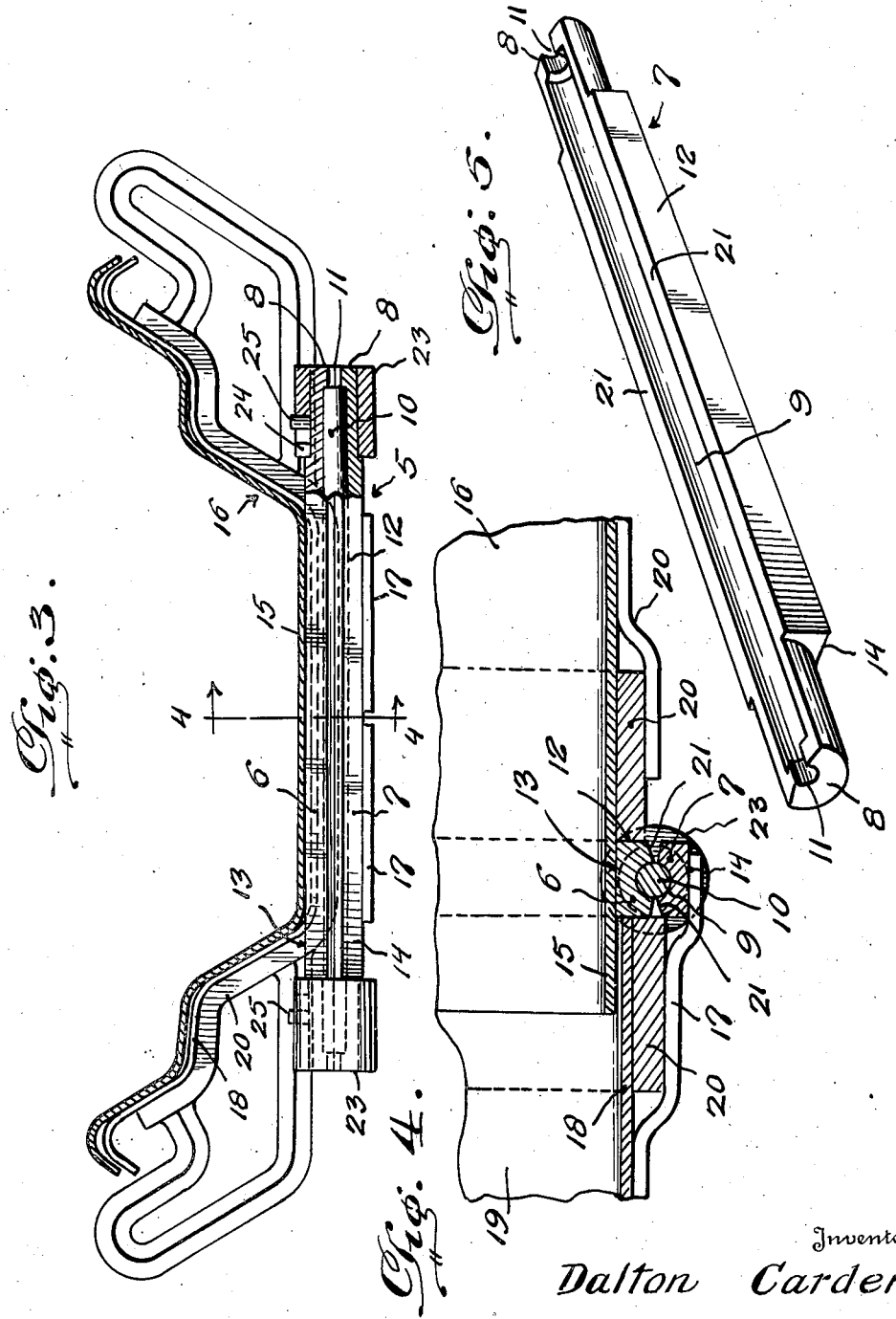

2,276,926

UNITED STATES PATENT OFFICE 2,276,926

SHAKING CONVEYER

Dalton Carden, Mount Harris, Colo.

Application August 4, 1941, Serial No. 405,416

2 Claims. (Cl. 198—220)

My invention relates to shaking conveyers and has particular reference to means for connecting the ends of the pans or troughs together.

One of the principal objects of my invention is to provide a device for connecting the ends of conveyer pans or troughs together and which is so constructed and arranged as to minimize the strain ordinarily imparted to the pans during their reciprocation.

Another object of my invention is to provide a device or coupling of the above described character so constructed and arranged whereby the ends of the pans may be quickly connected together with a minimum of effort.

An important object of my invention is to provide a device of the character described which is simple in construction, durable in use, efficient in operation and economical in manufacture.

Other objects and advantages will be apparent from the following description, appended claims and annexed drawings.

Referring to the drawings wherein like reference characters designate like parts throughout the several views:

Figure 1 is a top plan view of the lapped ends of a pair of pans coupled together by means of my invention.

Figure 2 is a side elevation of Figure 1.

Figure 3 is a transverse sectional view taken substantially on the line 3—3 of Figure 2.

Figure 4 is a detail sectional view taken on the line 4—4 of Figure 3.

Figure 5 is a detail perspective view of one of the sections of the coupling unit.

In practising my invention, as illustrated in the drawings, I provide an elongated coupling unit 5 formed with substantially identical upper and lower sections 6 and 7 respectively and with the ends of said unit being fashioned with end walls 8. The unit 5, on the interior of the opposed faces of the sections 6 and 7, is formed with a longitudinal bore 9 in which is disposed, between the end walls 8, a shaft 10. The bore 9, between the end walls 8, is of a materially greater diameter than its end portions 11 formed through the end walls thereby providing inner circumferential shoulders for engaging the end faces of the shaft 10 to maintain the shaft 10 within the unit against axial displacement. The end and interjacent portions of the unit are of cylindriform and square configurations respectively and with the interjacent portion defining side, top and bottom faces 12, 13 and 14 respectively. The top face 13 of the upper section 6 is connected to the underface of the inby end 15 of a pan 16, for instance, by welding or the like. The bottom face of the lower section 7 is connected, for instance, by means of welding or the like, to coincident ends of a pair of braces 17, the opposite ends of said braces being connected to the underface of the outby end 18 of an adjacent pan 19. The inby and outby ends 15 and 18 have secured to their underfaces transversely disposed reinforcing members 20 with one of said members being arranged on each side of the unit 5 and connected to the respective sections by means of welding or the like.

The upper and lower sections 6 and 7 are provided with pairs of oppositely disposed faces 21 and with the faces of each section being disposed in nonparallel relation with each other to permit relative rotation of the sections about the shaft 10, as clearly illustrated in Figure 4. The member 20 of the pan 19 is interposed between the bottom of the pan and the braces 17 while the member 20 of the pan 16 has secured thereto coincident ends of braces 22, the opposite ends of the braces 22 being connected to the bottom of the pan 16 adjacent the member 20.

Detachably mounted on the cylindriform ends of the unit are collars 23 formed with bayonet slots 24 in which are disposed pins 25 secured to the upper sections 6 of the unit whereby to maintain the collars detachably secured to the ends of the unit and thus maintain the upper and lower sections 6 and 7 together in connected relation. During the reciprocation of the conveyer in the act of gathering material and feeding thereof to a desired place, the pans or troughs of said conveyer are subjected to stresses both forwardly and rearwardly in a horizontal plane and also are subjected to upward stresses due to the receiving end of the conveyer encountering large masses of material tending to buckle the pans or troughs relative to each other. Such stresses place considerable strain on the connections between the pans or troughs, frequently resulting in broken connections and damage to the pans or troughs. The construction of the present invention readily compensates for such stresses by permitting limited relative movement upwardly and downwardly between the pans or troughs.

When employing the present invention it is extremely simple to couple and uncouple the pans or troughs. For instance, to couple the pans or troughs, adjacent ends thereof are brought into overlapping relation, as shown in Figure 4, with the sections of the coupling superimposed and spaced sufficiently apart to permit the shaft to be slid endwise into the companion grooves of the sections of the coupling. The sections of the coupling are then allowed to move toward each other, so that both sections become fully engaged with the shaft. The collars 23 are then adapted to the ends of the coupling sections preventing separation thereof, with the shaft 10 confined within the couplings, whereby the sections may rotate on the shaft for a limited distance to allow vertical movement of the pans or troughs relative to each other without being subjected to damaging strains either to the coupling or to the pans or troughs.

It will also be apparent that my novel form of coupling, when connected to the ends of shaker pans in the foregoing described manner, serves to relieve the ends of the pans of undue stress and thus increase the life of the pans, it being understood that the shaft and/or sections may be replaced when they become worn thereby eliminating the cost of replacing the pans per se.

While I have disclosed the shaft 10 as being loosely mounted within the sections 6 and 7, it is to be understood that said shaft may be fixed to one of said sections and movable relative to the other, or that the opposed face of one of said sections may be formed without its bored portion and provided with a substantially semicylindriform rib for rotatable mounting in the other section.

Without further elaboration the foregoing will so fully explain the invention that others may, by applying current knowledge, readily adapt the same for use under various conditions of service. Moreover, it is not indispensable that all the features of the invention be used conjointly since they may be employed advantageously in various combinations and sub-combinations.

It is obvious that the invention is not confined to the herein described use therefor as it may be utilized for any purpose to which it is adaptable. It is therefore to be understood that the invention is not limited to the specific construction as illustrated and described as the same is only illustrative of the principles of operation, which are capable of extended application in various forms, and that the invention comprehends all construction within the scope of the appended claims.

What I claim is:

1. A coupling unit provided with a pair of members each formed with a longitudinal groove disposed one adjacent the other and with said members adapted to be secured to the adjacent ends of a pair of conveyer pans respectively, a shaft disposed in said grooves and normally maintaining said members in sufficient spatiality to permit limited relative rotation of said members about said shaft, the ends of one of said members being provided with pins, and collars sleeved on the ends of both of said members and provided with bayonet slots receiving said pins for detachably securing said collars about the respective ends of said members to maintain the latter together in coupled relation about said shaft.

2. In a coupling unit, an elongated member including matched companion sections each having a groove and abutment walls at the ends of the groove, a shaft located in the grooves of the sections to space the latter a limited distance apart for hinging movement on the shaft, said shaft being limited in endwise movement by said abutment walls, pins carried by one of the sections, and collars fitted on the sections and having bayonet slots to receive the pins.

DALTON CARDEN.